Fig.1.

Nov. 10, 1942.　　P. H. DIXON　　2,301,202
METHOD OF AND APPARATUS FOR FOLDING
Filed Nov. 16, 1940　　6 Sheets-Sheet 2

INVENTOR
Paul H. Dixon
By his Attorney
Victor Cobb

Fig.5.

Nov. 10, 1942.  P. H. DIXON  2,301,202
METHOD OF AND APPARATUS FOR FOLDING
Filed Nov. 16, 1940  6 Sheets-Sheet 4

INVENTOR
Paul H. Dixon
By his Attorney
Victor Caleb

Nov. 10, 1942.   P. H. DIXON   2,301,202
METHOD OF AND APPARATUS FOR FOLDING
Filed Nov. 16, 1940   6 Sheets-Sheet 5

INVENTOR
Paul H. Dixon
By his Attorney
Victor Cobb

Patented Nov. 10, 1942

2,301,202

UNITED STATES PATENT OFFICE 2,301,202

METHOD OF AND APPARATUS FOR FOLDING

Paul H. Dixon, Wenham, Mass., assignor to United Shoe Machinery Corporation, Flemington, N. J., a corporation of New Jersey Application November 16, 1940, Serial No. 365,884

35 Claims. (Cl. 12—55)

This invention relates to methods of and machines for folding the margins of flexible sheet material such as parts of shoe uppers.

In the manufacture of shoe uppers, the top margin of the uppers are usually finished by skiving the margin and folding it inwardly against the body portion of the upper or by attaching a strip of French binding to the margin of the upper and folding it around the edge of the upper and securing it against the body portion on the inside. In order to secure permanently the folded portion, adhesive is applied to the work along the margin thereof. This adhesive is often applied to the work immediately prior to the folding operation either manually or by a cementing machine, after which the work is folded. When the work is precoated with adhesive, there is danger, particularly if a rubber cement is employed, that the work may be soiled thereby, as the cement is tacky and it may be smeared on the work during subsequent handling thereof. Where binding strips are secured to the leather to be folded around the edge thereof, the binding strips may be precoated before being supplied to the shoe manufacturer, but in either event, a separate operation is usually required to supply the cement to the work and to fold the work. It may also be necessary to activate the adhesive during the folding operation in some suitable manner as by the application of heat thereto. When precoated bindings are used it is often necessary to maintain a large supply of coated bindings of different colors in view of the variety of types of shoes being manufactured, and if the bindings are kept in stock for a long period of time before being used the adhesive thereon may deteriorate so that the binding strips will not adhere to the work as well as desired. In order to eliminate the necessity of precoating the leather or the binding strips with the resultant increase in the cost of manufacture and the possibility of deterioration of the adhesive if it is applied for a considerable length of time before the folding operation, the adhesive may be applied to the work as it is being folded. With this in view, it is an object of this invention to provide an improved apparatus for simultaneously coating and folding margins of flexible sheet material to eliminate the extra expense incident to precoating the leather or the French binding.

In accordance with one feature of the invention, the machine is arranged to deliver to the work being folded an adhesive of a type which will insure firm adhesion of the folded margin to the body of the work while requiring a very short time for the adhesive to set during which pressure must be applied to the folded portion. One type of adhesive that meets this requirement is a thermoplastic adhesive having a resinous base and the illustrated machine has provisions for maintaining the adhesive in a plastic condition until it is delivered to the work, after which it is allowed to cool whereupon it will harden very rapidly.

In order that the adhesive will be applied to the work immediately prior to the folding of the margin and in accordance with another feature of the invention, the adhesive is delivered to the work through a passageway in the creaser foot which is heated sufficiently to maintain the adhesive in a plastic condition until and for a very short time after it reaches the work.

A further feature of the invention resides in the method of folding which comprises delivering a thermoplastic adhesive to the work adjacent to the margin thereof, maintaining the adhesive heated until it is delivered to the work, folding the margin of the work immediately after the application of adhesive thereto, and pressing the folded margin.

In accordance with a further feature of the invention, the illustrated machine is equipped with a heated reservoir for a supply of adhesive, in the bottom of which reservoir is a continuously operating pump which delivers the adhesive to the creaser foot through a heated tube. The passageway through the creaser foot is of such size that the adhesive will not flow therefrom unless pressure is exerted thereon by the pump. This pressure is controlled by a valve which controls the inlet to the pump, the valve being actuated through a solenoid mechanism to insure positive and quick action of the valve so that the flow of adhesive from the creaser foot may be immediately cut off whenever desired.

As a further feature of the invention, heat is supplied to the bottom of the reservoir across which extend a plurality of heat-radiating ribs in the lower portion thereof, these ribs accelerating the rate of heating of the adhesive in the lower portion of the reservoir. The pump passes through alined apertures in the ribs and thus receives heat therefrom so that the ribs serve both to heat the pump and accelerate the rate of heating of the plastic in the reservoir adjacent to the pump.

It is sometimes necessary to fold certain portions of the work by hand, such as joints between overlapping ends, folds at sharp corners and the like. In order to apply adhesive to the work at such portions, and in accordance with a further feature of the invention, the machine is equipped with a roll for manually applying adhesive to the work wherever necessary. This roll is arranged to pick up adhesive from a metallic reservoir through the walls of which an electric current is passed to heat the adhesive therein.

The tube between the pump and creaser foot is also formed of metal similarly heated. The creaser foot has a metallic tube through which the adhesive passes, this tube being spaced from the creaser foot except at the lower portion thereof so as to form a passageway which may be heated by the passage of current therethrough. The tube in the creaser foot, the tube connecting the creaser foot and the pump, and the reservoir for the adhesive applying roll are connected in series to a source of power. This arrangement obviates the necessity of providing separate heating units therefor.

These and other features of the invention will now be described in detail and illustrated in the drawings, in which.

Figure 17:
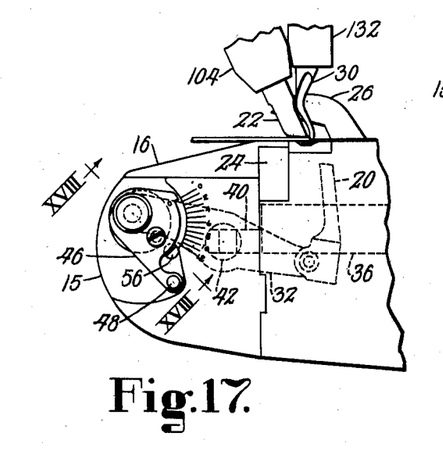
Fig. 17 is a front elevation of the outer end of the arm extending from the base of the machine, illustrating the relationship of the various work-engaging members.

The illustrated machine comprises a base 10, mounted on a bench 12, the base being provided with an arm 14 which overhangs the bench. The arm 14 has a nose piece 15 secured to the outer end thereof, the upper surface of the nose piece providing a work support 16. A neck 18 is mounted on the base 10 and overhangs the arm 14. A cover 19 encloses the neck 18. The folding instrumentalities include a folding finger 20 (Figs. 17 and 20) which is arranged to oscillate from a position below the upper surface of the arm 14, as indicated in Fig. 17, to the position shown in Fig. 20 in which it folds the margin of a work piece, supported on the arm and the work support 16, against the adjacent surface of a creaser foot 22. During the folding action or upward movement of the folding finger, the work is clamped against the under surface of the creaser foot 22 by a gripper member 24 which has a portion underlying the creaser foot and which oscillates from a position above the upper surface of the arm 14 to a position therebelow by mechanism of the type shown and described in Letters Patent of the United States 1,702,598, granted February 19, 1929, in the name of P. R. Glass. Adhesive is delivered to the work through the creaser foot 22 by a mechanism to be hereafter described. The folded margin of the work is pressed and the work is fed in a step-by-step manner by the cooperative actions of a hammer 26 and an anvil 28. The hammer first moves downwardly toward the anvil to press the folded margin against the body of the work, whereupon the hammer and anvil move as a unit rearwardly of the machine to feed the work. A gage finger 30, supported from the outer end of the neck 18 of the machine, is arranged to engage the edge of a work piece to which a binding strip has been secured thereby gaging the position of the work as it is fed through the machine. The machine as illustrated is thus equipped to fold a binding strip around the edge of a work piece, but it should be understood that the machine is adapted to fold margins of leather work pieces by substituting an appropriate gage for the one illustrated.

Figure 1:
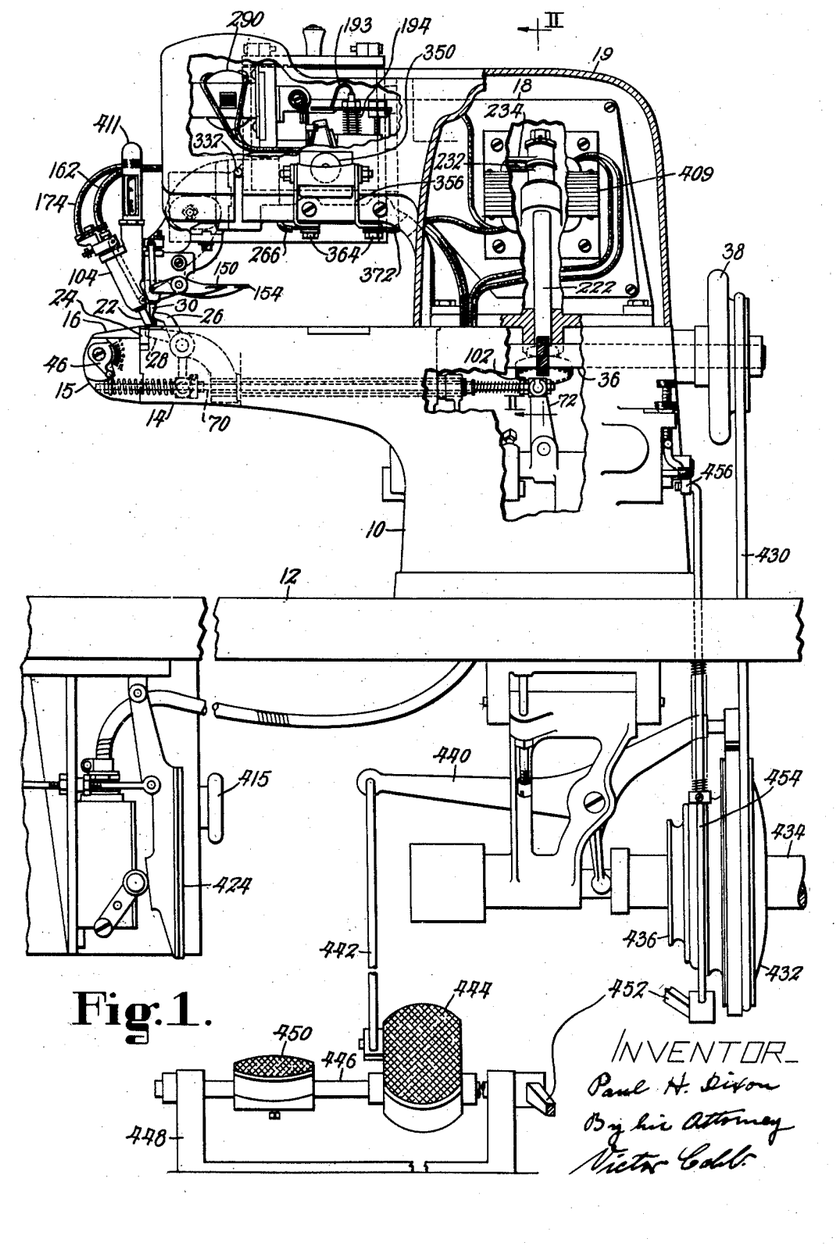
Fig. 1 is a front elevation partly in section of one form of machine in which the invention may be embodied.
Figure 18:
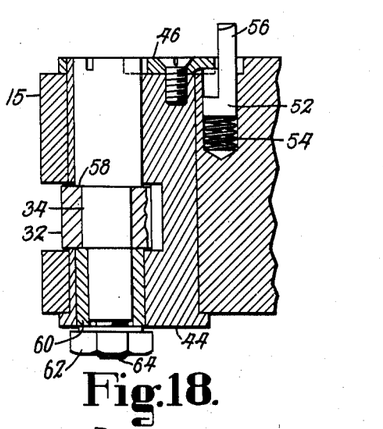
Fig. 18 is a sectional view, much enlarged, on the line XVIII—XVIII of Fig. 17, illustrating the mounting of the folding finger.

The folding finger 20 is mounted on the inner end of an arm 32 (Figs. 17 and 20), the outer end of the arm being mounted for oscillation on a stud 34 (Fig. 18). Oscillatory movement is imparted to the arm 32 to move the folding finger between the positions shown in Figs. 17 and 20, by a drive shaft 36 provided at one end with a drive pulley 38 (Fig. 1). The opposite end of the drive shaft 36 carries a crank pin 40 (Figs. 17 and 20) which is received by a slotted pin 42 carried by an intermediate portion of the arm 32 so that upon rotation of the drive shaft 36 the pin 40 imparts oscillatory movement to the arm 32 carrying the folding finger.

Provision is made for adjusting the path of movement of the folding finger in order to vary the space between it and the adjacent surface of the creaser foot by adjusting the position of the stud 34 on which the arm 32 is mounted. The stud is mounted in a bore eccentrically located in a bushing 44 (Figs. 18 and 20) journaled in the nose 15. An arm 46 secured to one end of the bushing 44 carries a handle 48 which facilitates turning the arm and with it the bushing 44 so as to adjust the position of the stud 34 in the nose piece 15. In order to hold the bushing in the desired position of adjustment, the inner surface of the arm 46 around the margin thereof is provided with a plurality of V-notches 50 (Fig. 19) with which cooperate a detent 52 urged into locking engagement with the arm 46 by a spring 54 (Fig. 18). The detent is provided with an outwardly extending portion 56 to facilitate movement of the detent inwardly of the arm 46 to permit rotation of the arm when adjustment of the path of movement of the folding finger is desired.

The arm 32 surrounds an intermediate portion of the stud 34 which is of reduced cross section and is maintained between a shoulder 58 and a sleeve 60 surrounding a reduced portion of the stud, the sleeve being held in place by a nut 62 on a threaded portion 64 of the stud. As indicated in Fig. 17, a suitable index point may be provided on the arm 46 to cooperate with indicia on the adjacent portion of the vertical wall of the nose piece 15 to indicate the degree of adjustment of the stud 34.

The hammer 26 which cooperates with the anvil 28 to press the folded margin of the work and to feed the work is formed at the upper end of an arm 66 (Fig. 20) which is pivoted between its ends on a pin 68 mounted in an arm 69, the outer end of which carries the anvil 28. Oscillatory movement is imparted to the hammer 26 to move the hammer toward and away from the anvil by a reciprocating rod 70 (Figs. 1 and 20), the inner end of which is connected to an arm 72 which is oscillated by the drive shaft 36 by mechanism such as that illustrated in U. S. Patent No. 2,270,891, granted January 27, 1942, application Serial No. 320,855, filed February 26, 1940, in the name of C. A. Newhall. The hammer-carrying arm 66 is bifurcated at its lower end to form arms 74 (Fig. 22) which embrace opposite sides of a block 76 mounted on the rod 70. Pins 78 pass through alined apertures in the arms 74 at the lower end of the arm 66 and pivotally connect the arm to the block 76 for movement therewith. The block 76 is maintained against a stop 80, carried by the rod 70, by a spring 82, the outer end of which bears against a nut 84 threaded on the outer end of the rod 70. The inner end of the spring 82 surrounds a reduced extension 86 of the block 76 and bears against the block, so that the hammer will be oscillated about the pin 68 as the rod 70 is reciprocated. The spring 82 forms a yielding connection between the arm 66 and the reciprocating rod to permit relative movements between these members to soften the blow of the hammer against the work. The lower end of the block 76 has a pair of spaced arms 88 (Fig. 22) which embrace a reduced depending portion of the stop 80 thus preventing rotative movement of the stop 80 and the rod 70 relative to the block 76 so that vibrations in the machine during the operation thereof will not cause unintended rotation of the rod 70.

In order to move the hammer and anvil as a unit to feed the work, the lower end of the arm 69 which supports both the hammer arm 66 and the anvil 28 is secured to the outer end of a sleeve 90 mounted for oscillation in a vertical wall 91 in the arm 14 of the machine. Oscillatory movement may be imparted to this sleeve by mechanism of the type illustrated in the Newhall application referred to above. It will be understood that the timing of the movements of the sleeve 90 and the rod 70 will be such that a work-feeding movement is imparted to the hammer and anvil after the hammer has moved to its pressing position, after which the hammer moves away from the anvil, and the hammer and anvil move as a unit back to their starting positions.

The base 10 of the machine is arranged to contain a supply of lubricant to maintain the moving parts in the base lubricated at all times. Provision is made for preventing the lubricant from traveling along the hammer-operating rod 70 and thus dripping on the bench 12 from the outer end of the rod. To this end, a washer 92 (Fig. 20) is arranged at the end of the sleeve 90 and has a machined surface in contact with the end of the sleeve. A spherical seat is provided in the other side of the washer to receive a correspondingly shaped portion of a sleeve 94, one end of which fits closely around the rod 70 and the other end of which is spaced from the rod to receive packing material 96. A washer 98 surrounding the rod 70 engages the sleeve 94 and is urged by a spring 100 to a position in which it maintains the sleeve 94 in seating engagement with the washer 92 as well as maintaining the washer in engagement with the adjacent end of the sleeve 90. The other end of the spring bears against nuts 102 (Fig. 1) threaded on to the rod 70 and movable therewith. This arrangement permits reciprocation of the rod 70 relative to the sleeve 90 as well as lateral and rocking motion relative thereto while effectively preventing passage of oil along the rod whence it might drip onto the supporting bench.

Figures 11, 12, 13, 14, 15, 16:
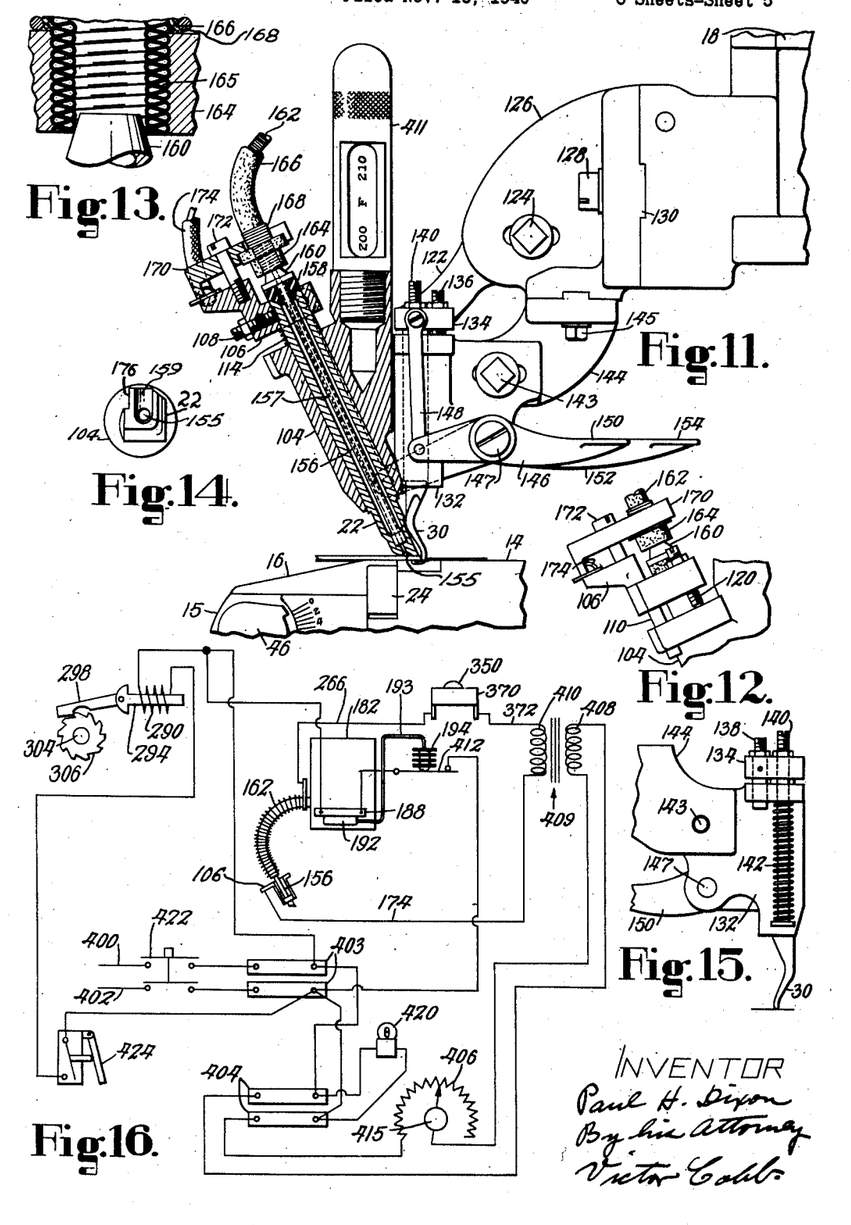
Fig. 11 is a view partly in section of the head of the machine, illustrating the construction of the creaser foot.
Fig. 12 is a detail view of the upper end of the creaser foot, illustrating the connection of the adhesive delivery tube.
Fig. 13 is a sectional view through the adhesive delivery tube at the outlet end thereof.
Fig. 14 is a bottom view of the creaser foot.
Fig. 15 is a rear elevation of the gage finger.
Fig. 16 is a diagram of the electrical circuits employed in the machine.

The creaser foot 22 against which the folding finger folds the margin of the work is mounted for yielding movement upwardly relative to the arm 14, in a support 104 (Fig. 11). This support has a bore in which the creaser foot slides which is substantially parallel to the path of movement of the folding finger so that there will be no substantial change in the distance between the folding finger and the adjacent surface of the creaser foot as the creaser foot yields upwardly in response to variations in the thickness of a work piece. An arm 106 is secured by a screw 108 to the upper end of the creaser foot, the inner end of the screw engaging a recess in the upper end of the creaser foot so that the correct position of the creaser foot in the arm is insured. The arm 106 carries a pair of pins 110 and 112 (Fig. 7) which extend through the enlarged upper end of the support 104 to prevent any rotative movement between the creaser foot and the support. The pin 112 extends a substantial distance downwardly below the upper end of the support 104 and a spring 114 surrounding the pin acts between a nut 116 threaded on the lower end of the pin and the enlarged upper end of the support 104 to urge the creaser foot downwardly relative to the support. The downward movement of the creaser foot is limited by a stop screw 120 (Fig. 12) carried by the arm 106 and engaging the adjacent surface of the support 104.

The creaser foot support 104 is mounted at the outer end of an arm 122 (Fig. 11) which is secured by a screw 124 to a bracket 126. The bracket is in turn secured by a screw 128 to the head 18 of the machine. In order to obtain the correct relationship between the creaser foot and the other folding instrumentalities, the bracket 126 is provided with a horizontally extending tongue 130 which cooperates with a groove in the neck 18 to provide for adjustment of the bracket in the direction of feed of the work thereby permitting similar adjustment of the creaser foot. The bracket 126 is slotted for the reception of the screw 124 threaded into the arm 122 to permit adjustment of the arm and of the creaser foot support 104 lengthwise of the neck 18 or transversely of the direction of feed.

The gage finger 30, which as illustrated is arranged to engage the edge of a piece of leather to which a binding strip has been secured, is mounted for vertical movement in a support 132 (Figs. 11 and 15), the upper end of the gage finger carrying an arm 134 through which is threaded a stop screw 136 to limit downward movement of the gage finger. Guide pins 138 and 140 (Fig. 15) extend through the arm 134 and a lateral extension of the gage finger support 132 to prevent rotative movement of the gage finger relative to its support. A spring 142 acts between the lower end of the pin 140 and a lip on the upper end of the gage finger support 132 to urge the gage finger downwardly.

The gage finger support 132 is adjustably secured by a screw 143 to a bracket 144 for adjustment of the gage finger transversely to the direction of feed whereas the bracket 144 is secured by a screw 145 to the bracket 126 for adjustment in the direction of feed. This permits adjustment of the gage finger in any direction relative to the other operating members when setting up the machine. In order to raise the gage finger 30 when desired, a lever 146 pivoted at 147 to the support 132 is connected by a link 148 to the arm 134 at the upper end of the gage finger. The other end of the lever 146 is provided with a thumb piece 150 so that the lever 146 may be rotated to raise the gage finger against the force exerted by the spring 142. A lever 152 also pivoted at 147 and having a thumb piece 154 is similarly connected to the upper end of the creaser foot 22 to enable the operator to lift the creaser foot against the force exerted by the spring 114.

The creaser foot 22 has a bore extending centrally therethrough as shown in Fig. 11 to permit the passage of adhesive to the work through the bottom work-engaging surface thereof. A shallow recess 159 in the bottom of the creaser foot extending forwardly in the direction of feed of the work prevents the creaser foot from immediately scraping away the cement which has just been applied to the work. The outlet opening 155 in the bottom of the creaser foot is small in diameter compared to the bore 157 in the rest of the creaser foot, and in that portion of the bore of large diameter is inserted a thin-walled tube 156 providing a passageway of the same diameter as the diameter of the outlet opening in the bottom of the creaser foot. The entire passageway through the creaser foot is thus of small diameter, so that adhesive will not flow therethrough unless pressure is applied to the adhesive. Therefore, by controlling the pressure applied to the adhesive, the flow of adhesive from the creaser foot may be readily controlled. The upper end of the tube 156 is spaced from the upper end of the creaser foot by a washer 158 made of suitable electric insulating material and mounted on the extreme upper end of the tube 156 is a conical fitting 160. Adhesive is delivered to the tube 156 in the creaser foot through a tube 162 having fitted on its lower end a washer 164 of insulating material. The tube 162 is in the form of a metal bellows 165 (Fig. 13) covered with a suitable heat-insulating material 166, such as asbestos, secured to the tube at its lower end by a cord 168. The tube bellows 165 within the washer 164 receives (Fig. 13) the small end of the conical fitting 160 and is held clamped on the fitting by a clamping member 170 (Fig. 11) having an end which bears on the arm 106 secured to the upper end of the creaser foot and a slotted end portion which embraces the tube 162 and bears against the upper surface of the washer 164. A screw 172 passes through the clamping member 170 and is threaded into the arm 106 to cause the washer 164 and the tube 162 to be clamped to the fitting 160 at the upper end of the creaser foot. Electric current is caused to pass, as will be later explained, through the bellows 165 of the tube 162 and the tube 156 in the creaser foot to maintain the passageway heated so that the adhesive, which is preferably in the form of a thermoplastic, will be maintained in a plastic condition until it reaches the work. After the current passes through the tube 156, it passes upwardly through the creaser foot 22 to a wire 174 connected to the arm 106. By spacing the tube 156 in the creaser foot from the walls thereof and insulating it therefrom at the upper end, the heating effect caused by the passing of an electric current is concentrated along the passageway through which the adhesive passes. The passageway is hotter than the rest of the creaser foot inasmuch as the resistance of the tube 156 is greater than that of the creaser foot, this arrangement eliminating unnecessary heating of the entire creaser foot.

The creaser foot is formed with a recess 176 (Fig. 14) in the wall facing the folding finger, and the folding finger moves within this recess in its upward movement thereby upsetting to some extent the upper margin of the work to which the binding strip is secured so that the edge of the leather is reduced somewhat in thickness, as explained more fully in United States Patent No. 2,266,026, granted December 16, 1941, in the name of H. Greenleaf.

Figure 5:
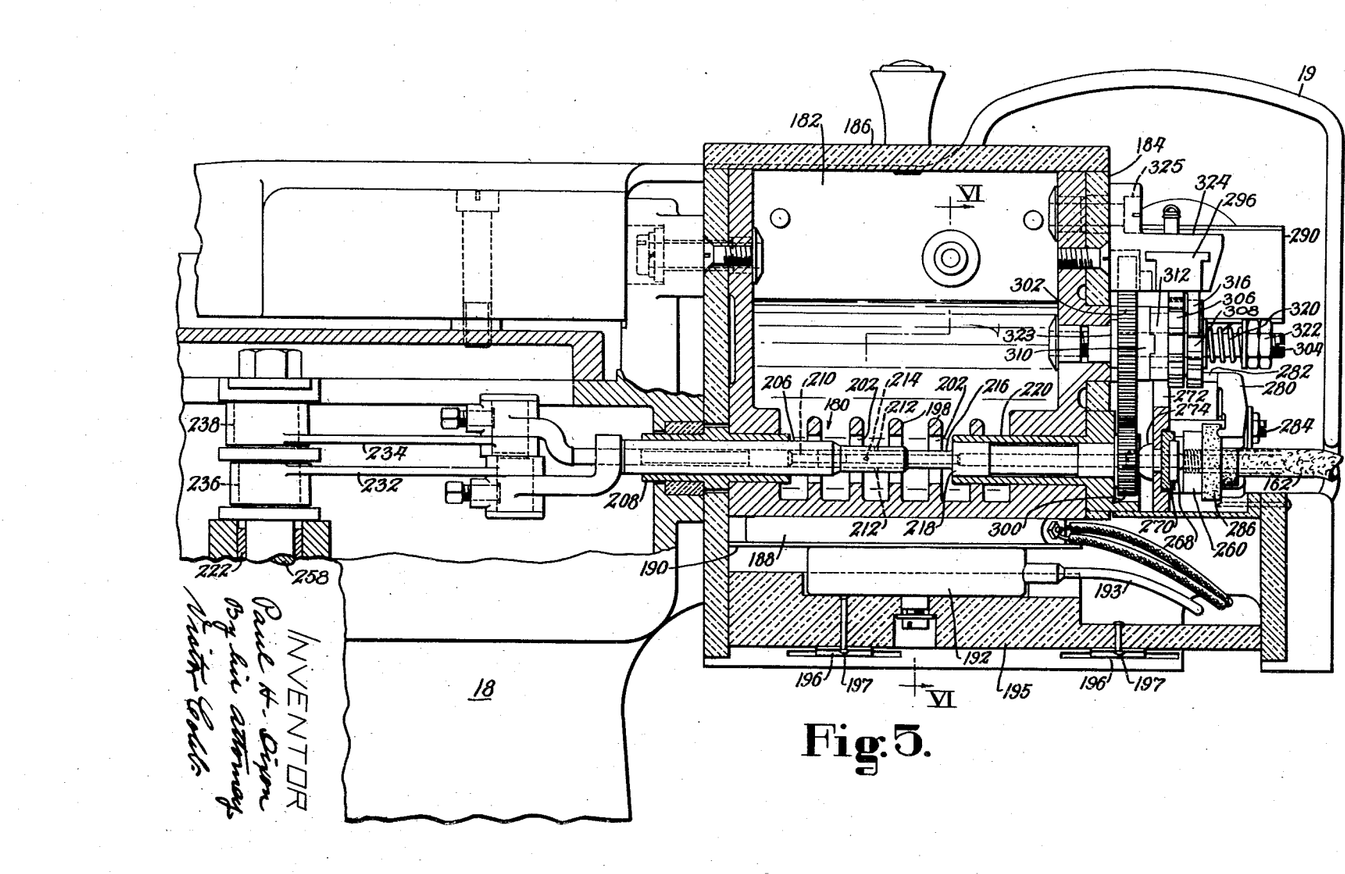
Fig. 5 is a vertical section on the line V—V of Fig. 2, illustrating the details of the pump and the adhesive reservoir.

Adhesive is delivered through the tube 162 to the creaser foot by a pump 180 (Fig. 5) in the bottom of an adhesive reservoir 182. This reservoir is secured to the back side of the neck 18 of the machine and is arranged to be heated so as to melt adhesive placed therein. Walls 184 of heat-insulating material surround the reservoir 182 and the top is enclosed by a cover 186 also formed of heat-insulating material. Heat is supplied to the reservoir by an electric heating element 188 mounted below and in contact with the bottom of the reservoir 182. Below the heating element 188 and spaced therefrom by a metal plate 190 is a bulb 192 having a suitable volatile fill, the bulb being connected by a capillary tube 193 to an expansible bellows 194 (Figs. 1 and 16) for operating a switch in control of the supply of current to the heater. The heater, plate 190 and bulb are maintained in place by a plate 195 (Figs. 5 and 6) of insulating material. This plate is removably secured to the walls 184 of the reservoir by means of spring elements 196 pivotally secured at their mid-points by pins 197 to the plate and arranged upon rotation of the springs to the position shown in Fig. 6, to enter recesses in the walls 184 to hold the plate in place.

Figures 2, 3, 4, 6:
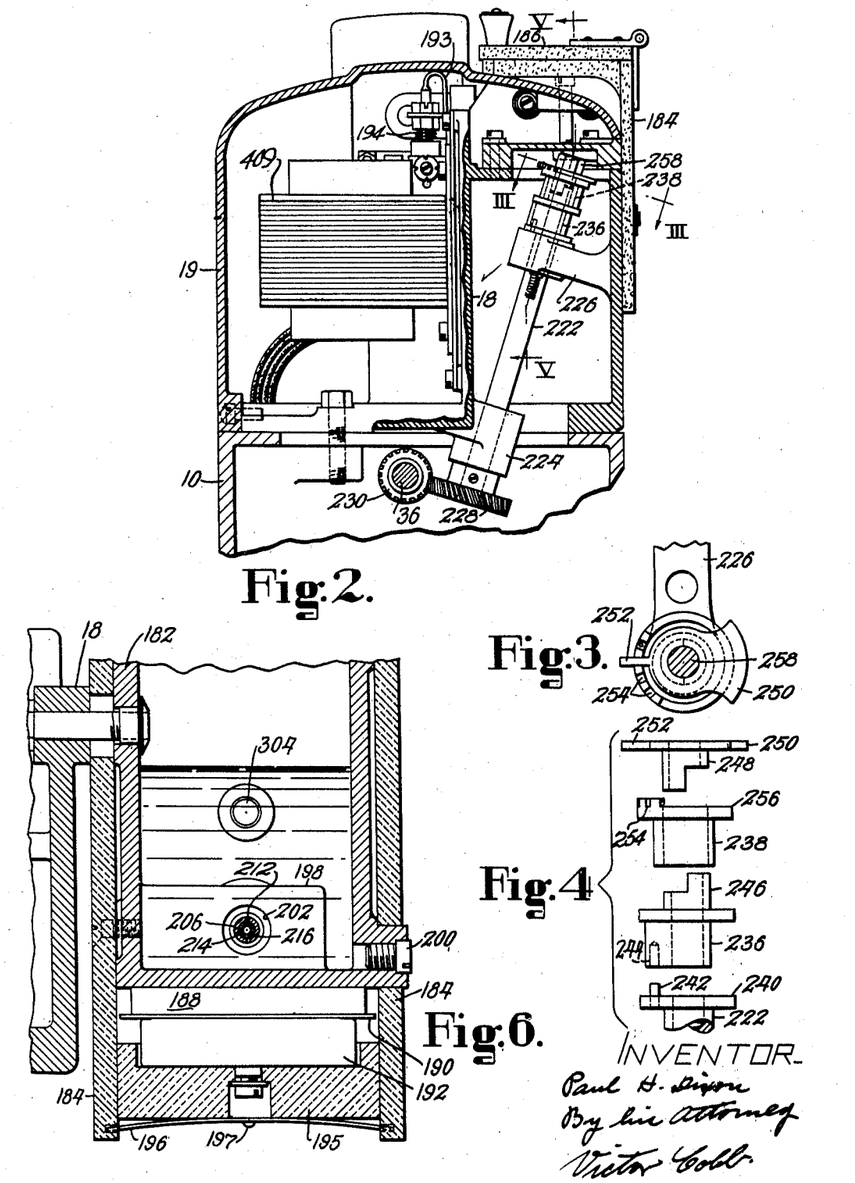
Fig. 2 is a vertical section on the line II—II of Fig. 1.
Fig. 3 is a section on the line III—III of Fig. 2.
Fig. 4 is an exploded view of the connections between the operating parts of the pump and a counter shaft.
Fig. 6 is a section through the adhesive reservoir taken on the line VI—VI of Fig. 5.

In order to provide a large heat-radiating surface in the bottom of the reservoir, the lower inner portion of the reservoir is formed with a plurality of heat-radiating ribs in the bottom and extending in parallel relationship from one wall of the reservoir to a position spaced from the opposite wall, as indicated in Fig. 6. A drain closed by a plug 200 is provided in the wall from which the ribs 198 are spaced to permit drainage of the reservoir, the spacing of the ribs from the wall facilitating drainage of adhesive from between each pair of ribs.

The ribs are provided with alined apertures 202 through which the pump 180 extends, the pump thus being heated by the ribs. The pump 180 comprises a reciprocable valve sleeve 206, a plunger 210 and an oscillatory valve sleeve 216 the end of which fits between the sleeve 206 and the plunger. The sleeve 206 is slidable in a bushing 208 mounted in the left wall of the reservoir 182 as viewed in Fig. 5. The plunger 210 is slidably supported within the sleeve 206, the forward end of the plunger being reduced in cross section and spaced from the adjacent surface of the sleeve. This reduced end cooperates with the axial passage in the oscillatory valve sleeve 216 to form a pump which sucks fluid from the reservoir through valve openings, to be described, and expels it through said axial passage in the sleeve 216. The sleeve 216, which has a turning or oscillatory movement, as described later, but has no reciprocating movement, is received within the outer end of the sleeve 206 and surrounds the forward end of the plunger 210. Forwardly of the plunger, the sleeve 206 is provided with a pair of ports 212 spaced 180° apart, which are arranged to provide communication from the reservoir to the interior of the sleeve 216 through the ports 214 therein, whenever they register, during the reciprocation of the sleeve 206, assuming that the sleeve 216 has been rotated through 90° from the position illustrated. The sleeve 216 thus constitutes a valve by which control of the flow of adhesive from the creaser foot is controlled, since the sleeve 216 controls the inlet to the pump and consequently the pressure applied to the adhesive in the creaser foot. The sleeve 216 has enlarged bearing surfaces 218 supported for rotative movement by a bushing 220 in the right hand wall of the reservoir 182. The plunger 210 and the sleeve 206 are constantly reciprocated during the operation of the machine by mechanism to be described, the timing of the sleeve 206 and plunger being such that if the sleeve 216 is rotated 90° from the position illustrated, the intake ports 214 will be in communication through the ports 212 with the reservoir during a portion of the intake stroke of the plunger and will be closed during at least a portion of the compression stroke of the plunger. Provision is made, as will be described, for varying the length of time that the intake ports are closed during the compression stroke of the plunger to vary the amount of plastic forced through the sleeve 216 at alternate strokes of the plunger.

The sleeve 206 and plunger 210 of the pump are driven from a counter shaft 222 (Figs. 1, 2 and 5) supported in bearing members 224 and 226 in the neck 18 of the machine. The lower end of the shaft 222 is connected to the drive shaft 36 through skew gears 228 and 230. The sleeve and plunger are connected by connecting rods 232 and 234 to eccentrics 236 and 238 respectively connected to the shaft 222 and arranged to be adjusted relative to one another. The upper end of the shaft 222 is flanged at 240 (Fig. 4), the flange carrying a pin 242 arranged to enter a recess 244 in the eccentric member 236 to lock it to the drive shaft. The eccentric 236 is integral with one portion of a supporting member 246 on which is adjustably mounted the eccentric 238 which drives the piston. The other part 248 of the support for the eccentric 238 is carried by a plate 250 having a finger 252 arranged to be received within one of a plurality of recesses 254 provided between projections extending upwardly from a flange 256 integral with the eccentric 238 for locking the member 248 and the eccentric 238 together. The portions 246 and 248 of the support for the eccentric 238 have complementary stepped portions for locking these members together. A screw 258 threaded into the shaft 222 (Fig. 2) locks the eccentric members together and to the drive shaft to prevent relative turning movements of the eccentrics. If it is desired to turn the eccentric 238 relative to the eccentric 236 to adjust the pump operation, the screw 258 is loosened whereby the finger 252 carried by the plate 250 may be lifted out of a recess 254 in the eccentric 238, thereby permitting rotation of the eccentric relative to its support formed by the members 246 and 248. After the eccentric has been turned to the desired position, the finger 252 is dropped into the adjacent notch 254 in the flange 256 of the eccentric 238 and since the plate 250 is prevented from rotating relative to the eccentric 236 by reason of locking engagement of the members 246 and 248, relative rotative movement between the eccentrics is thus prevented.

The upper end of the tube 162 through which adhesive is delivered to the creaser foot is connected to the pump through the sleeve 216 in a manner to prevent leakage of adhesive between the sleeve and the tube while permitting free twisting of the tube due to upward movement of the creaser foot relative to the work support. The upper end of the tube 162 has threaded on the end of the bellows part a metal washer 260 (Figs. 5 and 7), the washer having an extension 262 carrying a terminal 264 for an electric wire 266 through which current passes to the metal tube for heating the same. The end of the tube 162 is held by means to be described against a fitting 268 (Fig. 5) having a tapered portion which enters the end of the tube. The fitting 268 is held in a recess in a washer 270 formed of electrical insulating material, the washer being held in turn in a recess in a plate 272. The washer and plate have alined openings which register with the opening in the tube, and a ball and socket joint is provided between the plate 272 and the outlet end of the sleeve 216 by a member 274 having a spherical surface which seats in the opening in the outlet end of the sleeve and has a cylindrical portion received by the opening in the plate 272. The plate 272 (Fig. 9) is yieldingly secured to the adjacent wall of the reservoir 182 by screws 276 between the heads of which and the plate 272 are interposed springs 278. The springs 278 permit rocking movements of the plate 272 and the member 274 carried with it relative to the adhesive reservoir while maintaining the member 274 seated on the outlet opening of the sleeve 216.

The tube 162 and the washer 260 carried thereby are maintained seated against the fitting 268 while permitting movement of the tube and the plate 272 which carries the fitting 268 as the creaser foot yields or is moved upwardly relative to the work support. For this purpose, a clamping member 280 has one end held against a flange 282 carried by the plate 272, by a screw 284 threaded into the plate. The other end of the clamp 280 is held against a washer 286 of electric insulating material which surrounds the tube 162 and acts against the washer 260 to hold the end of the tube against the fitting 268. The provision of the washers 270 and 286 of insulating material insulates the metallic tube, through which electric current is caused to flow, as mentioned before.

Figures 7, 8, 9, 10:
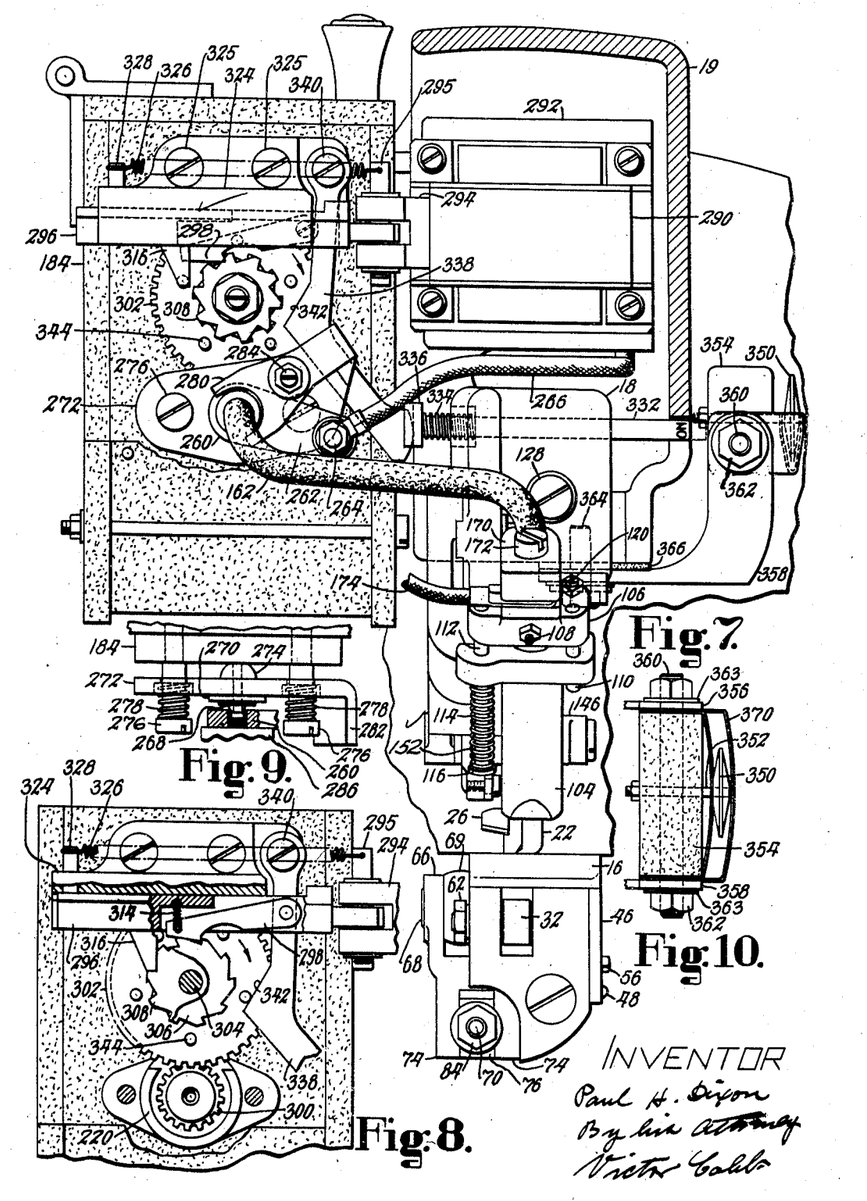
Fig. 7 is an end elevation of the machine as viewed from the left in Fig. 1 and with the cover broken away.
Fig. 8 is a view partly in section of the ratchet mechanism for controlling the position of the pump inlet valve.
Fig. 9 is a detail view partly in section, illustrating the connection of the adhesive delivery tube to the outlet of the pump.
Fig. 10 is a plan view of the repair roll.

The sleeve 216 is given quarter turns, alternately to open and close the ports 212 in the sleeve 206 of the pump upon successive energizations, at the will of the operator, of a solenoid 290 (Figs. 1, 5 and 7) carried by a plate 292 secured to the neck 18 of the machine. The solenoid includes an armature 294 to which is pivotally connected by a pin 295 a slide 296 carrying a pawl 298 (Fig. 8), which operates through mechanism to be described, to rotate the sleeve 216 through 90° upon each energization of the solenoid. The sleeve 216 is provided with a gear 300 which is driven from a gear 302 supported by a stud 304 (Fig. 5) carried by a wall of the reservoir 182. A pair of ratchet members 306 and 308 are also carried by the stud 304 and are caused to rotate with the gear 302 by clutch members 310 and 312 carried by the gear and ratchets respectively. The pawl 298 is urged downwardly into engagement with the teeth of the ratchet member 306 by a spring 314 (Fig. 8) so that upon movement of the slide 296 to the right, as shown in Figs. 7 and 8, upon energization of the solenoid 290, the gear 302 will be turned in the direction of the arrow sufficiently to rotate the sleeve 216 through 90°. In order to limit the amount of rotation of the gear 302 so that the valve will be rotated exactly 90°, a depending stop member 316 is carried by the slide 296 and cooperates with the ratchet 308. The teeth of the ratchet 308 face in the opposite direction from the teeth of the other ratchet and as the stop 316 moves from the position of Fig. 7 to that of Fig. 8, it is engaged by a tooth of the ratchet 308 to limit the rotation of the ratchet to a distance of one tooth only. In order to prevent any reverse rotation of the gear 302 upon movement of the slide 296 back to the position of Fig. 7, a spring 320 (Fig. 5) acts between the ratchet 308 and nuts 322 on the outer end of the stud 304 to maintain the gear 302 against a washer 323 formed of any suitable friction material, thereby preventing unintended rotation of the gear 302.

The slide 296 is supported in a bracket 324 secured by screws 325 to a wall of the reservoir 182. A spring 326 secured at one end to a stud 328 mounted on the outer end of the bracket 324 exerts a pull on the armature 294 to the left through the pin 295 which forms a pivotal connection between the armature and the slide 296. With this construction, upon each energization of the solenoid 290 the pawl 298 moves the ratchet 306 and with it the gear 302 through one-tenth of a revolution and any rotation beyond this amount is prevented by engagement of the stop 316 with the ratchet 308. The gear ratio between the gears 302 and 300 on the sleeve 216 is such that the sleeve will rotate through 90° upon rotation of the gear 302 through one-tenth of a revolution, so that successive energizations of the solenoid will cause the sleeve to move successively to open and closed positions. Upon deenergization of the solenoid, the armature 294 and the slide 296 are pulled by the spring 326 back to their original positions without causing any rotation of the sleeve.

In order to apprise the operator of the position of the sleeve 216 at any time, a visual signal device is provided which is controlled by the gear 302. This signal device comprises a plunger 332 (Fig. 7) which is slidably mounted in the neck 18 and has a portion arranged to project outwardly of the front of the machine. The plunger is urged inwardly of the machine by a spring 334 acting between a head 336 on the plunger and the neck 18 into engagement with the lower end of an arm 338 pivoted at 340 to the bracket 324. The arm has an inclined cam surface 342 which is maintained in the path of a plurality of pins 344 carried by the gear 302 so that when the gear moves from the position of Fig. 7 to that of Fig. 8 the lower end of the arm 338 is moved toward the right against the force of the spring 334 to move the forward end of the plunger 332 outwardly of the machine. The plunger may have the word "on" stamped in the surface thereof so that this word is visible when the sleeve is moved to a position in which adhesive may be delivered by the pump to the work. Movement of the arm 338 by the spring 334 when the sleeve is moved to close the ports 212 in the sleeve 206 is limited by engagement of the arm with a portion of the bracket 324, as shown in Fig. 7.

Provision is made for manually applying adhesive to any portion of the work which it may be necessary to fold by hand, such as joints between overlapping ends, folds at sharp corners and the like. This adhesive-applying means is in the form of a roll 350 (Figs. 1, 7 and 10) journaled on a stud 352 supported in a block of electric insulating material 354. This block is secured between a pair of brackets 356 and 358 by a screw 360 extending through the block 354 and threaded at opposite ends to receive nuts 362. Washers 363 of insulating material insulate the brackets from the nuts 362 and the screw 360. These brackets are supported on the machine by screws 364 which pass into the under side of the neck 18, there being a block of insulating material 366 interposed between the brackets and the neck while other insulation is provided to separate the screws from the bracket. The roll 350 projects upwardly from a reservoir 370 for a supply of adhesive, the reservoir being formed, as indicated in Fig. 10, of thin sheet metal and secured between the brackets 356 and 358 and the block 354. The walls of the reservoir are so designed that upon passage of a low voltage current therethrough they will be heated sufficiently to maintain the adhesive in the reservoir in a plastic condition. Wires 266 and 372 are connected to the supporting brackets 356 and 358 by the screws 364 (Fig. 1).

The electrical control circuit for the machine is illustrated diagrammatically in Fig. 16. Main line wires 400 and 402 are connected through fuses 403 and 404 and a rheostat 406 to the primary 408 of a step-down transformer 409. This transformer is secured to the rear part of the neck 18 of the machine as shown in Fig. 1. To the secondary 410 of the transformer is connected in series the reservoir 370 for the roll 350, the tube 162 through which adhesive flows to the creaser foot, and the tube 156 in the creaser foot. The heating of these elements may be varied by adjusting the rheostat 406 which varies the current through the transformer primary 408, by an adjusting knob 415 (Figs. 1 and 16). A thermometer 411 (Figs. 1 and 11) mounted in the upper part of the creaser foot is provided to indicate the temperature thereof and to determine the proper setting of the rheostat 406. The heater 188 in the reservoir 182 is connected through a thermostatic switch 412 and the fuses 403 to the main line wires 400 and 402. The switch 412 is controlled by the bellows 194 connected through the capillary tube 193 to the bulb 192 mounted just below the heater 188 and provided with a volatile fill so that the expansion of the bellows 194 after the temperature of the heater has exceeded a predetermined value opens the switch to interrupt the further flow of current through the heater, thereby controlling automatically the amount of heat supplied to the reservoir 182. A tell-tale light 420 is connected across the main fuses 403 to indicate when a switch 422 in the main line is closed.

The solenoid 290 is also connected to the main line wires through the fuses 403 and through a switch 424 which may be mounted below the bench 12, as shown in Fig. 1, in a position to be operated by the knee of the operator. This switch may be of a conventional type which will maintain the circuit through the solenoid closed as long as pressure is applied to the switch arm and will open the circuit upon release of such pressure.

The pulley 38 on the main drive shaft of the machine is connected by a belt 430 (Fig. 1) to a pulley 432 on a shaft 434. This pulley receives power from a drive pulley 436 which is moved into and out of clutching engagement with the pulley 432 by a lever 440 connected by a rod 442 to a treadle 444 which may be loosely mounted on a rod 446 supported in a frame 448 resting on the floor. A second treadle 450 is secured to the rod 446 and is connected by an arm 452 and a rod 454 to an arm 456, the raising and lowering of which by actuation of the treadle 450 serves to vary the length of feed by the hammer and anvil as described more fully in Letters Patent of the United States 1,702,598, granted February 19, 1929, on an application of P. R. Glass.

Figures 19, 20, 21, 22, 23, 24:
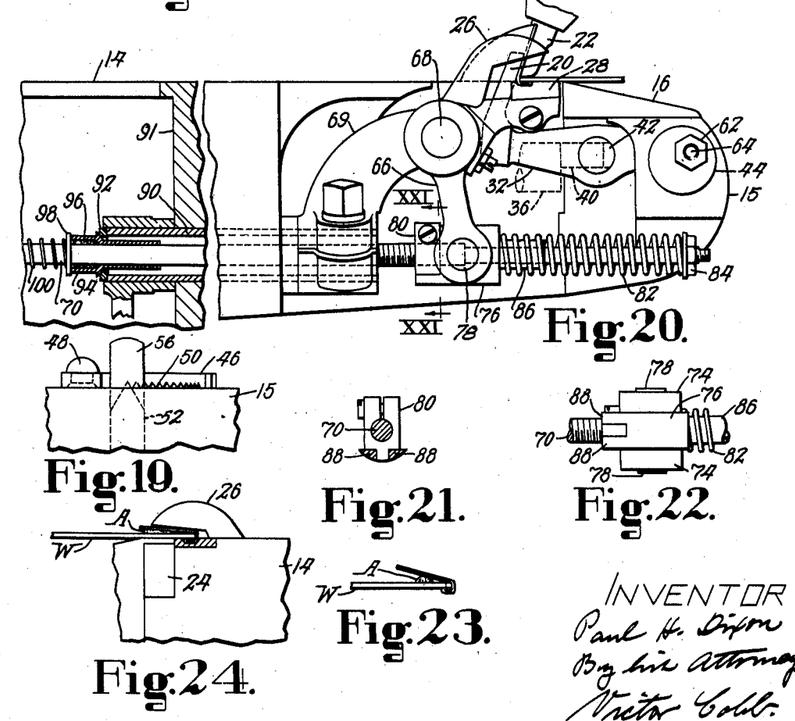
Fig. 19 is a view looking upwardly and toward the left end of the machine, showing the folding finger adjusting means.
Fig. 20 is a rear elevation of the lower arm of the machine, showing the hammer and anvil mechanism in detail.
Fig. 21 is a section on the line XXI—XXI of Fig. 20.
Fig. 22 is a view looking from the bottom of the machine, illustrating the connection between the hammer and the hammer operating rod.
Fig. 23 is a view of a work piece just prior to the final pressing of the folded margin, showing the adhesive as it is delivered thereto by the creaser foot.
Fig. 24 is a view as the folded margin is pressed against the work and illustrating the spreading of the adhesive.

In the operation of the machine, the operation of the shaft 36 and accordingly of the hammer and anvil and folding finger are controlled by the treadle 444. After a piece of work W has been presented to the machine and the treadle 444 operated to cause rotation of the shaft 36, the folding finger will oscillate to turn up the margin of the work against the adjacent surface of the creaser foot 22 whereupon the hammer will move toward the anvil to press the folded portion and feed the work. During this time the pump 180 will also be in operation and if the sleeve 216 has been moved from the position shown in Fig. 5 to a position in which it may register with the inlet ports 212 upon energization of the solenoid 290 by operation of the switch 424, adhesive A of any suitable type, such as a thermoplastic adhesive having a resinous base will be supplied to the work through the creaser foot inwardly of the line of fold and in the form of a ridge, as indicated in Fig. 23. It should be understood that the adhesive may extend to the line of fold as it is deposited, or the ridge of adhesive may stop short of the line of fold as illustrated. The adhesive will be maintained in a plastic condition by the heating of the tube 162 and the creaser foot until it reaches the work. During the pressing of the margin by the hammer, the adhesive which has been deposited on the work will be spread out, as indicated in Fig. 24, so that when the margin is completely pressed, a thin layer of adhesive of substantially uniform thickness will be spread under the entire width of the folded margin. The adhesive will harden very rapidly as it cools so as to render it unnecessary to apply pressure thereto for any substantial period of time. Instead of stopping the machine each time a piece of work has been folded, the operator may, by operation of the switch 424, close the valve 216 to interrupt the flow of adhesive by the pump through the creaser foot so that operation of the machine, while no work is in it, will not cause adhesive to be forced through the creaser foot on to the upper surface of the arm 14.

Having thus described my invention, what I claim as new and desire to secure by Letters Patent of the United States is:

1. A folding machine comprising a work support, means for forming a fold in the margin of a work piece, a creaser foot against which the margin of the work is folded by said folding means, said creaser foot having a surface engaging the work adjacent to and inwardly of the line of fold, means for delivering a thermoplastic adhesive through said creaser foot to the work by way of said work-engaging surface, and means for maintaining said adhesive heated during its passage through the creaser foot to the work.

2. A folding machine comprising a work support, means for forming a fold in the margin of a work piece, a creaser foot against which the margin of the work is folded by said folding means, said creaser foot having a surface engaging the work inwardly of the line of fold and a passage terminating in said work-engaging surface for the delivery of adhesive to the work inwardly of the line of fold, and means for heating said creaser foot along the entire length of said passage.

3. In a folding machine, means for progressively folding the margin of a work piece, pressing the folded margin, and feeding the work, means engaging the body of the work inwardly of the line of fold for holding the work against movement during the folding of the margin, said holding means having a passage terminating in its work-engaging surface for delivering adhesive to the body of the work, and means for heating said holding means along the entire length of said passage.

4. In a folding machine, a creaser foot having a surface against which the margin of a work piece is folded and a surface arranged to engage the work adjacent to the line of fold, said creaser foot having a passage terminating in said last-named surface through which adhesive may be supplied to the work, and means for heating said passage uniformly throughout substantially its entire length.

5. In a folding machine, means for folding the margin of a piece of work, a creaser foot mounted for yielding movement away from the work, said creaser foot having a passageway terminating in a work-engaging portion thereof, a flexible tube connected to the inlet of the passageway in said creaser foot, means for heating said tube and said passageway throughout substantially the entire lengths thereof, and means for forcing adhesive through said tube and through the passageway in said creaser foot.

6. In a folding machine, means for folding the margin of a work piece, a creaser foot against which the margin of the work is folded, said creaser foot having a passageway terminating in a work-engaging portion thereof, an adhesive reservoir, a tube connecting said reservoir and said creaser foot, and means for heating said reservoir, said tube and said creaser foot.

7. In a folding machine, means for folding the margin of a piece of work, a creaser foot against which the margin of the work is folded, said creaser foot having a portion engaging the body of the work inwardly of the line of fold and having a passageway terminating in said work-engaging portion, an adhesive reservoir connected to said passageway, a pump for causing flow of adhesive from the reservoir through the passageway in said creaser foot, means for heating said reservoir and said creaser foot, and means for controlling the flow of adhesive to said creaser foot.

8. In a folding machine, means for folding the margin of a piece of work, means engaging the body of the work adjacent to the margin thereof and inwardly of the line of fold for delivery of adhesive thereto, an adhesive reservoir, a continuously running pump for delivering adhesive from the reservoir to said work-engaging means, and a valve at the inlet to said pump for controlling the flow of cement from the reservoir to said work-engaging means.

9. In a folding machine, means for folding the margin of a piece of work, a creaser foot against which the margin of the work is folded, said creaser foot having a portion engaging the body of the work inwardly of the line of fold and having a passageway terminating in a work-engaging portion thereof, an adhesive reservoir, a continuously running pump having an inlet in communication with said reservoir and an outlet communicating with the passageway in said creaser foot, means for heating said reservoir and said creaser foot, and means at the inlet to said pump for controlling the flow of cement from the reservoir to the pump.

10. In a folding machine, means for folding the margin of a piece of work, means for delivering adhesive to the work adjacent to the margin thereof, an adhesive reservoir, a continuously running pump having an inlet in communication with said reservoir and an outlet communicating with said adhesive-delivering means, a valve at the inlet of said pump, and a solenoid controlling said valve and arranged upon successive energizations thereof alternately to open and close the inlet to said pump.

11. In a folding machine, means for folding the margin of a piece of work, means for delivering adhesive to the work along the margin thereof during the folding operation, a rotary valve controlling the supply of adhesive to said delivery means, a solenoid, a ratchet mechanism operated thereby and connected to said valve for alternately opening and closing the valve in response to successive energizations of the solenoid, and means associated with said ratchet mechanism to limit the rotative movements of the valve to a predetermined amount.

12. In a folding machine, means for folding the margin of a piece of work, means for delivering adhesive to the work along the margin thereof during the folding operation, a rotary valve controlling the supplying of adhesive to said delivery means, a solenoid, a ratchet mechanism operated thereby and connected to said valve for alternately opening and closing the valve in response to successive energizations of the solenoid, and means controlled by said ratchet mechanism to indicate the position of the valve.

13. In a folding machine, means for folding the margin of a piece of work, an adhesive reservoir, a continuously running pump having its inlet communicating with said reservoir, means connected to the outlet of said pump and arranged to conduct adhesive therefrom to the work along the margin thereof during the folding operation, a rotary valve at the inlet of said pump, a ratchet mechanism connected to said valve for alternately opening and closing the valve, means for operating said ratchet mechanism, and means controlled by said ratchet mechanism for indicating the position of said valve.

14. In a folding machine, means for folding the margin of a piece of work, an adhesive reservoir, means for applying heat to the bottom of said reservoir, said reservoir being provided with ribs extending upwardly from the bottom thereof, said ribs being provided with aligned openings, a reciprocatory pump located in the lower portion of said reservoir and extending through the openings in said ribs, said pump having an inlet communicating with said reservoir, and means connected to the outlet of said pump for delivering adhesive to the margin of the work during the folding operation.

15. In a machine of the character described, a reservoir for adhesive to be supplied to a work piece, means for applying heat to the bottom of said reservoir to melt the adhesive therein, a plurality of heat radiating ribs extending in parallel relationship across the bottom of said reservoir from one side thereof and terminating short of the opposite side, and a drain in the lower portion of said reservoir in said last-named side.

16. In a folding machine, means for folding the margin of a work piece, an adhesive reservoir, a continuously operating pump having its inlet connected to said reservoir, means for conducting adhesive from the outlet of said pump to the margin of the work during the folding operation, said conducting means having a capillary passageway in the outlet end thereof, and a valve for controlling the flow of adhesive from the reservoir to the inlet of said pump.

17. In a folding machine, a creaser foot, means for folding the margin of a work piece against said creaser foot, said creaser foot having a passageway extending therethrough and terminating in a work-engaging surface thereof for the delivery of adhesive to the work, and means for heating said passageway to a temperature higher than that of the rest of the creaser foot.

18. In a folding machine, a creaser foot, means for folding the margin of a work piece against said creaser foot, said creaser foot having a bore extending lengthwise therethrough and terminating in a work-engaging surface thereof, a metallic tube in said bore, said tube being spaced from the creaser foot throughout the length thereof except at the bottom and forming a passageway for adhesive to be applied to the work, and means connecting said tube to a source of electricity for heating the passageway through the creaser foot.

19. In a folding machine, a creaser foot, means for folding the margin of a work piece against said creaser foot, said creaser foot having a bore extending lengthwise therethrough and terminating in a work-engaging surface thereof, a metallic tube in said bore, said tube being spaced from the creaser foot throughout the length thereof except at the bottom and forming a passageway for adhesive to be applied to the work, and means for heating said tube hotter than the surrounding creaser foot.

20. In a folding machine, a creaser foot, means for folding the margin of a work piece against said creaser foot, said creaser foot having a bore extending lengthwise therethrough and terminating in a work-engaging surface thereof, a metallic tube in said bore spaced from the creaser foot throughout the length thereof except at the bottom, an adhesive reservoir, a metallic tube between the reservoir and the tube in said creaser foot, and means connecting said tubes in series to a source of electricity for maintaining the adhesive passing therethrough in a plastic condition.

21. In a folding machine, a creaser foot having a passageway therethrough for the delivery of adhesive to a work piece, a metallic tube for supplying adhesive to the creaser foot, an adhesive applying roll, a metallic reservoir for supplying adhesive to said roll, and means connecting said tube and said reservoir in series to a source of electricity for heating said tube and said reservoir.

22. In a folding machine, a creaser foot, means for folding the margin of a work piece against said creaser foot, said creaser foot having a bore extending lengthwise therethrough and terminating in a work-engaging surface thereof, a metallic tube in said bore spaced from the creaser foot throughout the length thereof except adjacent to said work-engaging surface and forming a passageway for adhesive being delivered to the work, an adhesive reservoir, a metallic tube between said reservoir and said creaser foot, an adhesive applying roll, a metallic reservoir for supplying adhesive to said roll, and means connecting said tubes and said last-named reservoir in series to a source of electricity for maintaining the adhesive in these members in a plastic condition.

23. In a machine of the character described, a coating transfer roll, means mounting said roll for rotation about a substantially horizontal axis, a metallic reservoir in which said roll dips to transfer material from said reservoir to a work piece placed against the roll, and means connecting the walls of said reservoir at spaced points to a source of electricity to cause the passage of an electric current through the walls whereby the walls are heated thereby to maintain the material within the reservoir at a desired temperature.

24. In a folding machine, means for folding the margin of a work piece, means for intermittently feeding the work by said folding means, an adhesive reservoir, a reciprocatory pump having its inlet in communication with said reservoir, means for conveying adhesive from the outlet of said pump to the work along the margin thereof, and common drive means for said feeding means and said pump.

25. In a folding machine, means for folding the margin of a work piece, means for intermittently feeding the work by said folding means, an adhesive reservoir, a reciprocatory pump having its inlet in communication with said reservoir, means for conveying adhesive from the outlet of said pump to the work along the margin thereof, and means for varying the effective stroke of the pump to vary the amount of adhesive delivered to the work.

26. In a machine of the character described, a reservoir for adhesive to be delivered to a work piece, a reciprocatory pump in the lower portion of said reservoir arranged to cause a flow of adhesive from the reservoir to the work, said pump having an inlet communicating with the interior of said reservoir, and a rotary valve at the inlet of said pump arranged to control the flow of adhesive from the reservoir to the pump.

27. In a machine of the character described, a reservoir for adhesive to be delivered to a work piece, a reciprocatory pump in the lower portion of said reservoir arranged to cause a flow of adhesive from the reservoir to the work, said pump having an inlet communicating with the interior of said reservoir, a rotary valve at the inlet of said pump arranged to control the flow of adhesive from the reservoir to the pump, means for applying heat to the bottom of said reservoir, and a plurality of heat-radiating ribs extending at least partially across the bottom of said reservoir, said ribs encircling said pump.

28. In a machine of the character described, a reservoir for the supply of adhesive to be delivered to a work piece, a pump in the lower portion of said reservoir having an inlet communicating with the interior of said reservoir, means for conveying adhesive from the outlet of said pump to the work, said pump comprising a pair of telescopically related sleeves, means for reciprocating the outer sleeve, said sleeves having ports arranged to register when the inner sleeve is in a predetermined position, the inner sleeve being connected to said adhesive-conveying means, a piston in said inner sleeve, and means for reciprocating said piston relative to said outer sleeve.

29. In a machine of the character described, a reservoir for the supply of adhesive to be delivered to a work piece, a pump in the lower portion of said reservoir having an inlet communicating with the interior of said reservoir, means for conveying adhesive from the outlet of said pump to the work, said pump comprising a pair of telescopically related sleeves, means for reciprocating the outer sleeve, said sleeves having ports arranged to register when the inner sleeve is in a predetermined position, the inner sleeve being connected to said adhesive-conveying means, a piston in said inner sleeve, means for reciprocating said piston relative to said outer sleeve, and means for turning said inner sleeve to move the port therein out of alignment with the port of the outer sleeve to render the pump inoperative.

30. In a machine of the character described, a reservoir for the supply of adhesive to be delivered to a work piece, a pump in the lower portion of said reservoir having an inlet communicating with the interior of said reservoir, means for conveying adhesive from the outlet of said pump to the work, said pump comprising a pair of telescopically related sleeves, means for reciprocating the outer sleeve, said sleeves having ports arranged to register when the inner sleeve is in a predetermined position, the inner sleeve being connected to said adhesive-conveying means, a piston in said inner sleeve, means for reciprocating said piston relative to said inner sleeve, and means for adjusting the timing of said piston and said outer sleeve to vary the amount of adhesive delivered by the pump upon each stroke of the piston.

31. In a folding machine, means for folding the margin of a work piece, means including a pump for delivering adhesive to the margin of the work during the folding operation, said pump comprising a pair of telescopically related sleeves, a piston arranged for sliding movement in the inner sleeve, said inner and outer sleeves each having a port therein, means for reciprocating said outer sleeve relative to said inner sleeve whereby the port in the outer sleeve is moved into and out of register with the port in the inner sleeve, and means for reciprocating the piston relative to said inner and outer sleeves but at the same rate as that of the outer sleeve.

32. In a folding machine, means for folding the margin of a work piece, means including a pump for delivering adhesive to the margin of the work during the folding operation, said pump comprising a pair of telescopically related sleeves, a piston arranged for sliding movement in the inner sleeve, said inner and outer sleeves each having a port therein, means for reciprocating said outer sleeve relative to said inner sleeve whereby the port in the outer sleeve is moved into and out of register with the port in the inner sleeve, means for reciprocating the piston relative to said inner and outer sleeves but at the same rate as that of the outer sleeve, and means for turning said inner sleeve to prevent communication between the ports in said sleeves during the reciprocation of said outer sleeve.

33. In a folding machine, means for folding the margin of a work piece, means including a pump for delivering adhesive to the margin of the work during the folding operation, said pump comprising a pair of telescopically related sleeves, a piston arranged for sliding movement in the inner sleeve, said inner and outer sleeves each having a port therein, means for reciprocating said outer sleeve relative to said inner sleeve whereby the port in the outer sleeve is moved into and out of register with the port in the inner sleeve, means for reciprocating the piston relative to said inner and outer sleeves but at the same rate as that of the outer sleeve, and means for adjustably timing the piston and the outer sleeve relative to one another.

34. The method of finishing the edge of a piece of flexible sheet material which comprises delivering a thermo-plastic adhesive to the work piece along the margin thereof, maintaining the adhesive heated until it reaches the work, and folding the edge of the work piece and pressing the folded portion against the body of the work with the adhesive underlying the folded portion substantially immediately after the delivery of the adhesive to the work.

35. The method of finishing the edge of a piece of flexible sheet material which comprises progressively delivering to a work piece along the margin thereof a thermoplastic adhesive, heating the adhesive to a predetermined temperature and maintaining the adhesive substantially at that temperature until it reaches the work, and progressively folding the edge of the work and pressing the folded portion against the body of the work with the adhesive underlying the folded portion substantially immediately after the delivery of the adhesive to the work.

PAUL H. DIXON.